(12) United States Patent
Smith et al.

(10) Patent No.: US 7,559,238 B1
(45) Date of Patent: Jul. 14, 2009

(54) MEMS INERTIAL SHOCK BANDPASS FILTER

(75) Inventors: Gabriel L. Smith, Odenton, MD (US); Daniel J. Jean, Odenton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 306 days.

(21) Appl. No.: 11/444,816

(22) Filed: May 26, 2006

(51) Int. Cl.
*G01P 15/135* (2006.01)

(52) U.S. Cl. .................. 73/514.38; 73/652; 73/12.04

(58) Field of Classification Search .............. 73/514.38, 73/514.01, 652, 12.01
See application file for complete search history.

(56) References Cited

U.S. PATENT DOCUMENTS

| | | | |
|---|---|---|---|
| 5,592,349 A | 1/1997 | Morehouse et al. | |
| 5,705,767 A | 1/1998 | Robinson | |
| 6,064,013 A | 5/2000 | Robinson | |
| 6,167,809 B1 | 1/2001 | Robinson et al. | |
| 6,321,654 B1 | 11/2001 | Robinson | |
| 6,617,963 B1 | 9/2003 | Watters et al. | |
| 7,159,442 B1* | 1/2007 | Jean | 73/12.01 |
| 7,194,889 B1* | 3/2007 | Jean et al. | 73/12.04 |
| 7,266,988 B2* | 9/2007 | Kranz et al. | 73/12.01 |
| 2005/0252308 A1* | 11/2005 | Hjelt et al. | 73/862.041 |

\* cited by examiner

*Primary Examiner*—Hezron Williams
*Assistant Examiner*—Nashmiya S Fayyaz
(74) *Attorney, Agent, or Firm*—Fredric J. Zimmerman

(57) ABSTRACT

An inertial shock bandpass filter for detecting a shock event between first and second acceleration levels. The inertial shock bandpass filter includes a primary inertial element and at least one secondary inertial element supported by respective spring arrangements. The inertial elements include complementary engageable gripping surfaces, which engage in response to an acceleration above the second acceleration level to prevent movement of the primary inertial element and prevent latch engagement. The primary inertial element will, in response to an acceleration between the first and second acceleration levels, engage the latch. An acceleration level below the first acceleration level is insufficient to cause either an engagement of the gripping surfaces or a latching of the primary inertial element.

9 Claims, 5 Drawing Sheets

MEMS INERTIAL SHOCK BANDPASS FILTER

STATEMENT OF GOVERNMENT INTEREST

The invention described herein may be manufactured and used by or for the Government of the United States of America for government purposes without the payment of any royalties therefor.

BACKGROUND OF THE INVENTION

A need exists for a device that is capable of sensing inertial shock within a certain range or bandpass of acceleration levels. Such a device is useful, for example, in the arming sequence of a munition round to allow the arming sequence to commence when the round is fired, but to prevent the sequence if the round is merely dropped. In an exemplary application, one or more such devices may be placed on a shipping container to see if the container has been subject to shock, as well as to what level of shock.

One way of providing the desired function is by the use of an accelerometer. One problem with the accelerometer, however, is that it requires not only a power supply but a signal processor as well. Such arrangement needs a significant volume to package the necessary components, which is impractical for various situations, including use in a munition round.

It is an aspect of the present invention to provide an inexpensive miniature inertial shock bandpass filter, which is fabricated utilizing MEMS (micro electromechanical systems) techniques.

SUMMARY OF THE INVENTION

In accordance with the present invention, an inertial shock bandpass filter device for detecting a shock event between first and second acceleration levels includes a primary inertial element, and at least one secondary inertial element. A first support structure for the primary inertial element is provided along with a first spring arrangement connecting the primary inertial element to the first support structure. A second support structure for the secondary inertial element is provided along with a second spring arrangement connecting the secondary inertial element to the second support structure. The device includes a latch, with the primary inertial element including a latch arm for engagement with the latch when the primary inertial element moves far enough in response to an acceleration between the first and second acceleration levels. The primary inertial element and the secondary inertial element include complementary engageable gripping surfaces which engage in response to an acceleration above the second acceleration level, such engagement preventing movement and latching of the primary inertial element. An acceleration level below the first acceleration level is insufficient to cause engagement of the gripping surfaces, or the latch arm with the latch.

BRIEF DESCRIPTION OF THE DRAWINGS

The invention will be better understood, and further objects, features and advantages thereof will become more apparent from the following description, taken in conjunction with the accompanying drawings, in which.

DETAILED DESCRIPTION OF EXEMPLARY EMBODIMENTS OF THE INVENTION

Figure 1:
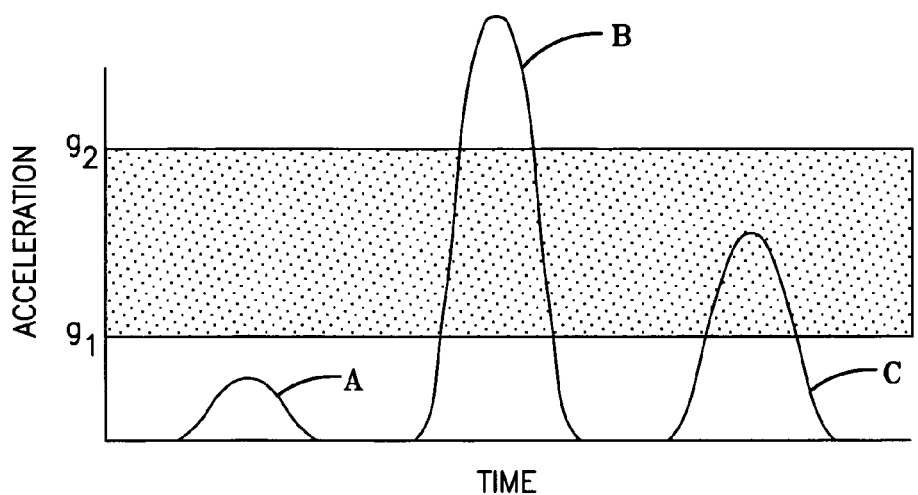
FIG. 1 is a graph illustrating different acceleration levels.

In the drawings, which are not necessarily to scale, like or corresponding parts are denoted by like or corresponding reference numerals.

In FIG. 1, acceleration is plotted on the vertical scale and time is plotted on the horizontal scale. The inertial shock bandpass filter device of the present invention is operative in the range, or bandpass, shown shaded between acceleration levels $g_1$ and $g_2$. More particularly, if the device is subjected to an acceleration less than $g_1$, as indicated by curve A, the acceleration will not be high enough to activate the device. Conversely, if the acceleration is too high, that is, greater than $g_2$, as indicated by curve B, it will be outside the bandpass and the device likewise will not be activated. If, however, the acceleration is within the bandpass, between $g_1$ and $g_2$, as indicated by curve C, activation will take place.

Figure 2:
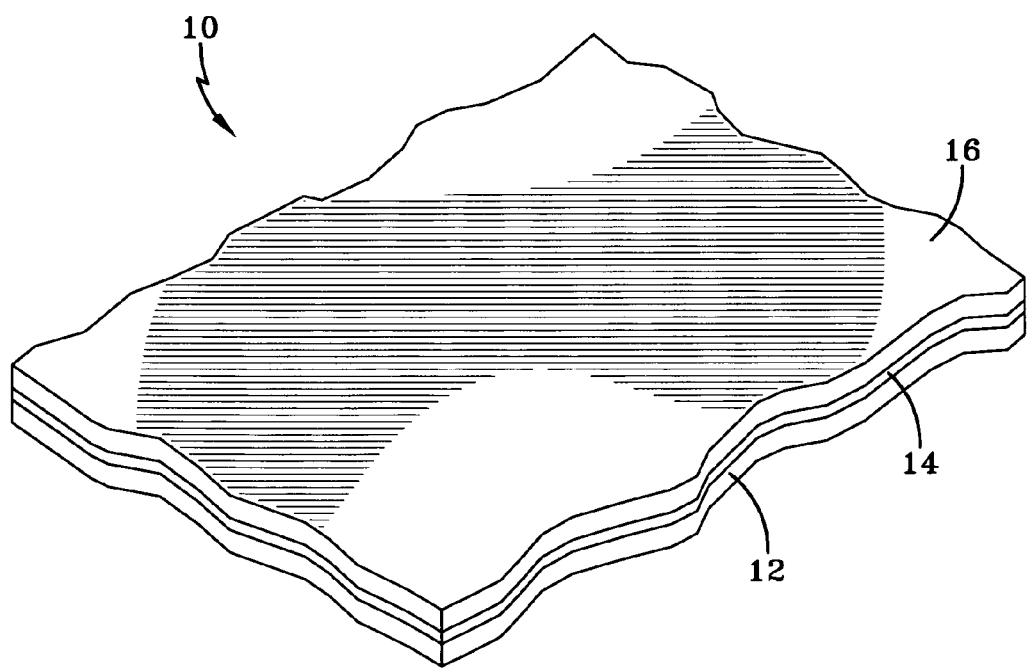
FIG. 2 is a view of an SOI (silicon on insulator) wafer prior to fabrication of the inertial shock bandpass filter.

FIG. 2 illustrates a portion of an SOI wafer 10 from which the inertial shock bandpass filter of the present invention may be fabricated. The structure of FIG. 2 includes a silicon substrate 12 (also known as a handle layer) covered by an insulating layer 14, such as silicon dioxide, over which is deposited another silicon layer 16 (also known as the device layer), which is the layer from which the inertial shock bandpass filter will be fabricated. In an alternate embodiment, the structure of FIG. 2 may be made of materials other than silicon, for example, the structure may be made from electroplated metal.

Figure 3:
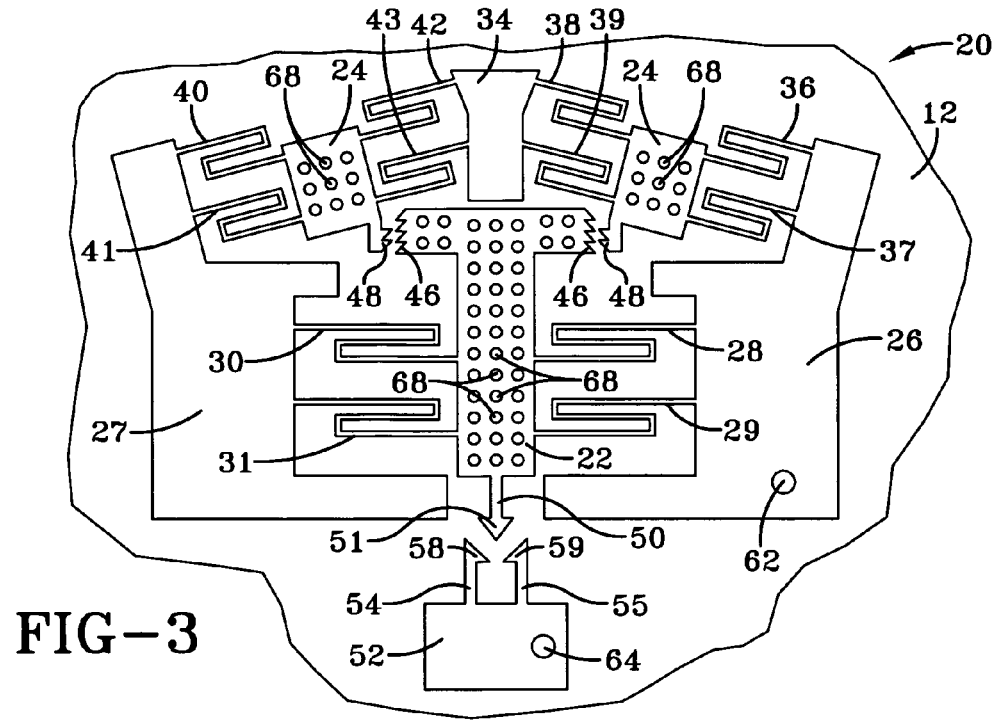
FIG. 3 is a plan view of an embodiment of the present invention.

FIG. 3 is a view of an individual inertial shock bandpass filter 20 formed from the wafer 10 of FIG. 2. The inertial shock bandpass filter 20 is formed by a DRIE (deep reactive ion etching) process which removes unwanted portions of layer 16. The DRIE process is a well developed micromachining process used extensively with silicon based MEMS (micro electromechanical systems) devices. Although silicon is a material generally used for the inertial shock bandpass filter of the present invention, although other materials are possible as indicated above, such as, electroplated metal. Inertial shock bandpass filter 20 is one of a multitude of similar devices fabricated on the same wafer 10, with all of the devices being separated after fabrication for use as individual inertial shock bandpass filters.

The inertial shock bandpass filter 20 includes a primary inertial element 22 including a certain mass, and one or more secondary inertial elements 24. Two such secondary inertial elements 24 are shown by way of example, and each has a mass which is less than that of inertial element 22. Primary inertial element 22 is connected by a spring arrangement to a support structure, which includes first and second spaced-apart supports 26 and 27. The spring arrangement includes, in an exemplary embodiment, serpentine shaped, that is, substantially S-shaped or folded (leaf) shaped springs 28 and 29 connecting the primary inertial element 22 to support 26, and serpentine springs 30 (same as springs 28 and 29) and 31 connecting the inertial element 22 to support 27. The serpentine springs 28, 29, 30 and 31 may be of different tensions with different thicknesses or spring constants, which can vary as needed.

Secondary inertial elements 24 (sometimes referred to as inertial elements 24) are also connected to a support structure including respective supports 26 and 27, as well as to a common support 34. The spring arrangement for secondary inertial elements 24 include serpentine springs 36 to 43, for example, substantially S-shaped springs, as illustrated. The mass-spring system of each inertial element 24 and associated springs 36 to 39 or 40 to 43, is designed to have a slower response to acceleration than the mass-spring system of inertial element 22 and associated springs 28 to 31. Generally, a mass of inertial element 24 is less than a mass of inertial element 22.

Inertial elements 22 and 24 each include complementary gripping surfaces for preventing movement of inertial element 22, when the surfaces are engaged. For this purpose, inertial element 22 is formed with a series of teeth 46, that is, gripping surfaces, and inertial elements 24 are formed with a series of teeth 48, that is, gripping surfaces. The series of teeth 46, 48 are either in contact or separate from each other by a predetermined distance as indicated below. The spacing between teeth sets, or the reflection distance, is calculated based on a friction threshold needed to impede the movement of the masses.

A latching arm 50, including a first arrowhead portion 51, is connected to inertial element 22 where the latching arm 50 is capable of engaging a latch 52. The latching arm 50 is intermediate the first arrowhead portion 51 and the inertial element 22. More particularly, latch 52 includes projecting arms 54 and 55, including second and third arrowhead portions 58 and 59. If inertial element 22 travels far enough it will be captured by the latch 52 in view of the arrowhead configuration.

If the inertial shock bandpass filter 20 is utilized to determine if it, or a container to which it is attached, has experienced a shock event within the bandpass illustrated in FIG. 1, the determination may be made electrically. To accomplish this outcome, electrical contact pad 62 is connected to support 26, and electrical contact pad 64 is connected to latch 52. Since the silicon is electrically conducting, a completed electrical circuit will be established between contact pads 62 and 64 by virtue of the capture of inertial element 22 in latch 52. The inertial shock bandpass filter 20 would normally be contained in a protective package (not illustrated) through which electrical connection may be made with appropriate terminals on the package and the contained contact pads 62 and 64. An electrical read out device may be applied to the package terminals to sense the latched condition. In addition, multiple such inertial shock bandpass filters, each with a different bandpass, may be applied to the container. In another exemplary embodiment, an actuator arm (not illustrated) may be connected to inertial element 22 to move, physically, a lock mechanism, for example, in an arming arrangement for a munition round.

To operate as an inertial shock bandpass filter, inertial elements 22 and 24 as well as springs 28 to 31 and 36 to 43, must be free to move and therefore must be free of any underlying silicon dioxide insulating layer 14. An exemplary way to accomplish the removal of the underlying insulating layer is by applying an etchant, such as, hydrofluoric acid to dissolve the silicon dioxide.

The etchant will, in a relatively short period of time, dissolve the insulation beneath the springs, which are of small width, thus freeing them for movement. In order to shorten the time for dissolving the silicon dioxide under the inertial elements 22 and 24, the inertial elements 22, 24 are provided with a series of apertures 68, which extend from a top surface down to the insulating layer 14, thereby allowing the etchant direct access to the undersurface of the inertial elements 22, 24. Although some of the etchant dissolves the insulation under the supports 26, 27 and 34, the process of freeing the inertial elements and springs is completed before the supports 26, 27, 34, are completely freed, and thus remain immovable.

Figure 3A:
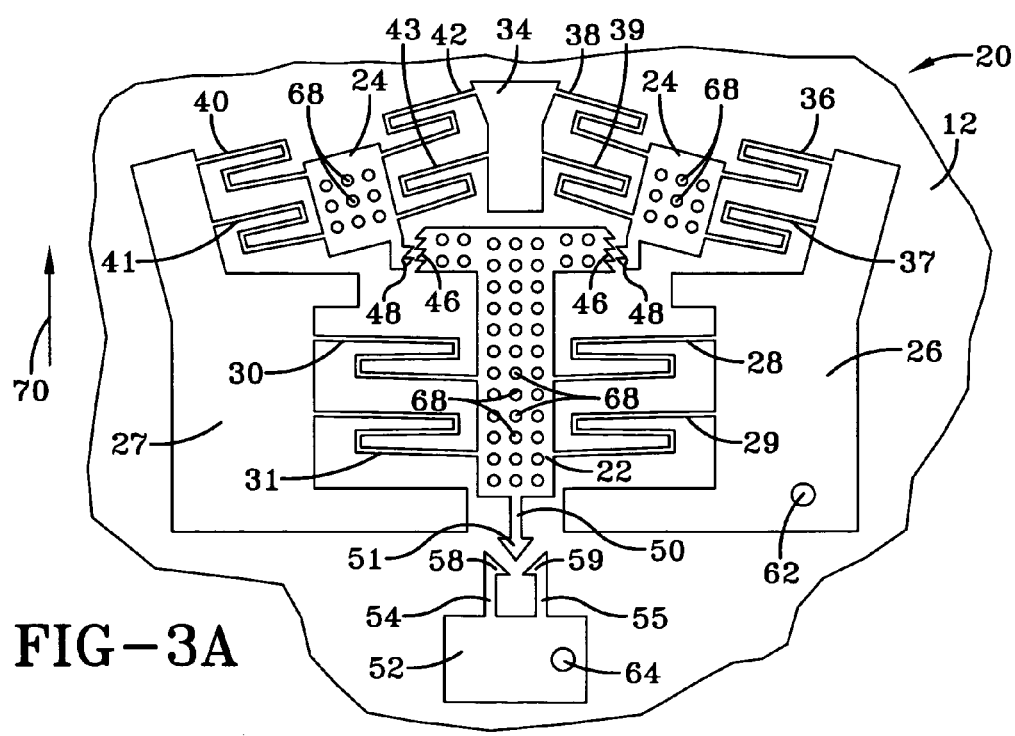
FIGS. 3A to 3C illustrate responses of the device of FIG. 3 to different accelerations.
Figure 3B:
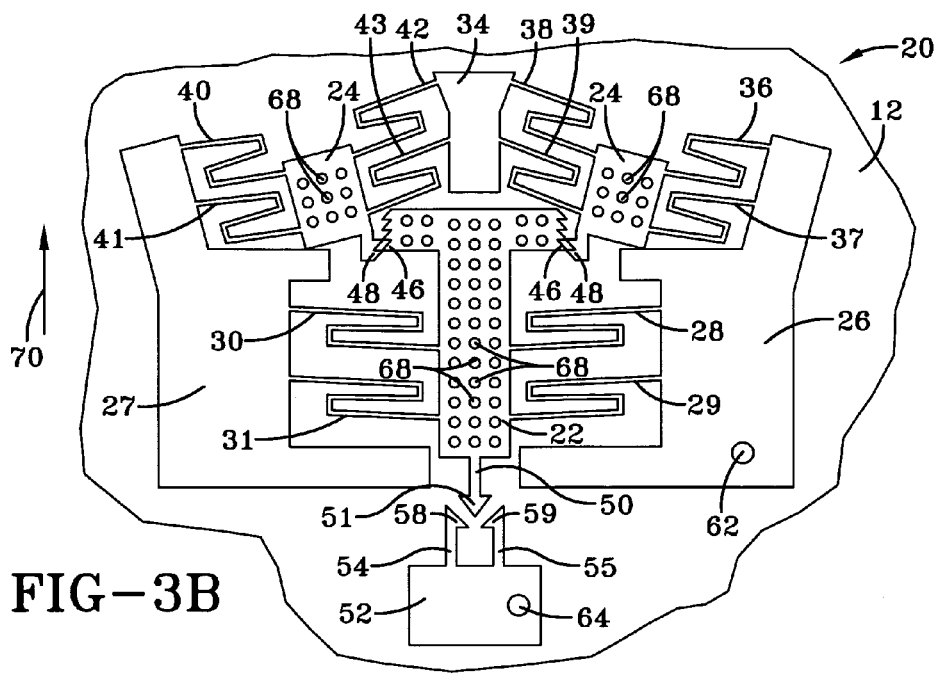
Figure 3C:
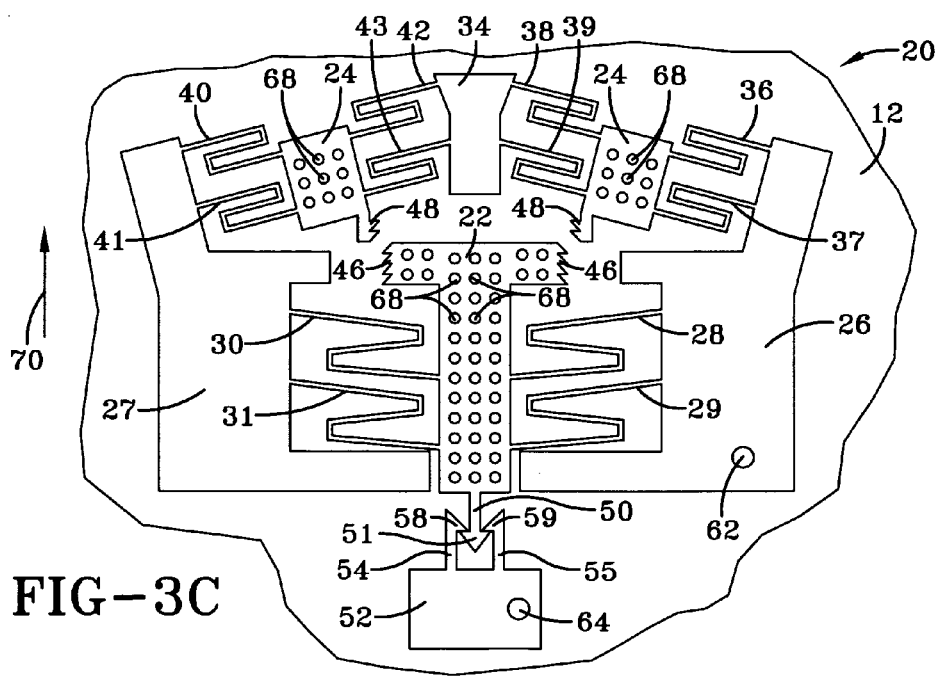

As illustrated in FIG. 3A, if the inertial shock bandpass filter 20 is subjected to a mild shock in the direction of arrow 70, as depicted by curve A of FIG. 1, the inertial elements 22 and 24 move very slightly, but not enough to effect an engagement of teeth 46 with teeth 48, nor a latching of inertial element 22 with latch 52. If a high shock condition is experienced as depicted by curve B of FIG. 1, inertial elements 24, as shown in FIG. 3B, will move sufficiently fast such that teeth 48 of inertial elements 24 will engage teeth 46 of inertial element 22 and prevent its movement toward latch 52. For the in passband condition of curve C of FIG. 1, that is between, $g_1$ and $g_2$, inertial elements 24 will not move far enough under the acceleration conditions for teeth 46 and 48 to engage, however, inertial element 22 will move far enough to latch or contact (but without teeth engagement) thereby allowing a latching condition, as shown in FIG. 3C.

Figure 4:
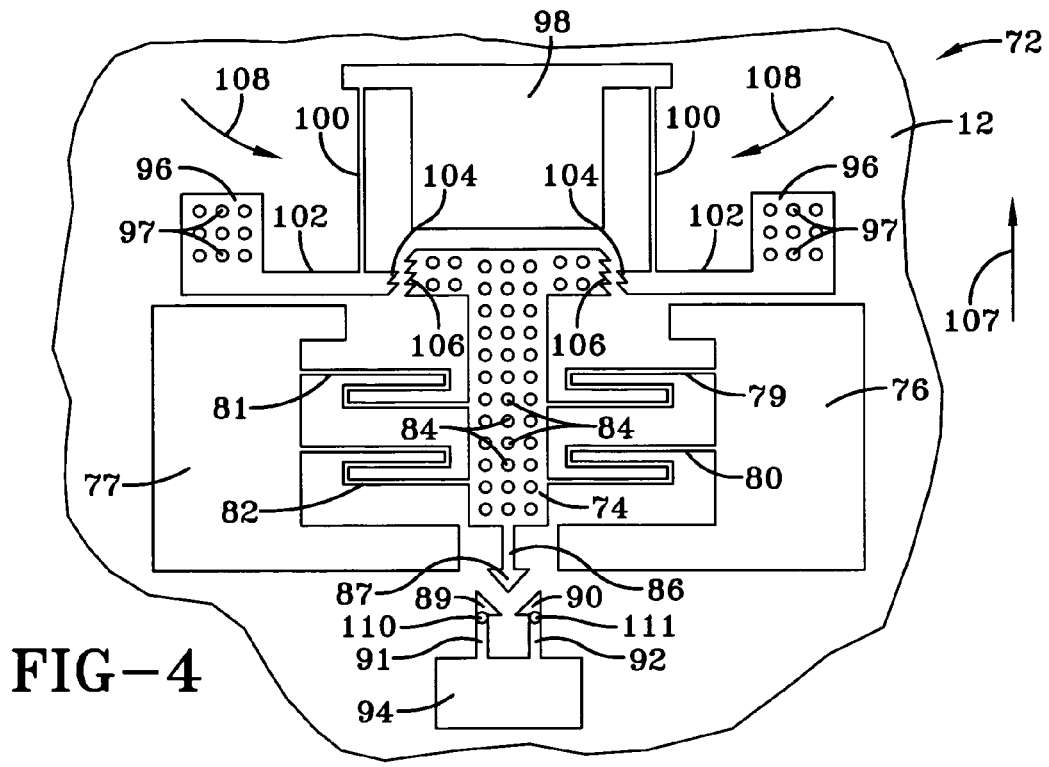
FIG. 4 is a plan view of another embodiment of the present invention.
Figure 4A:
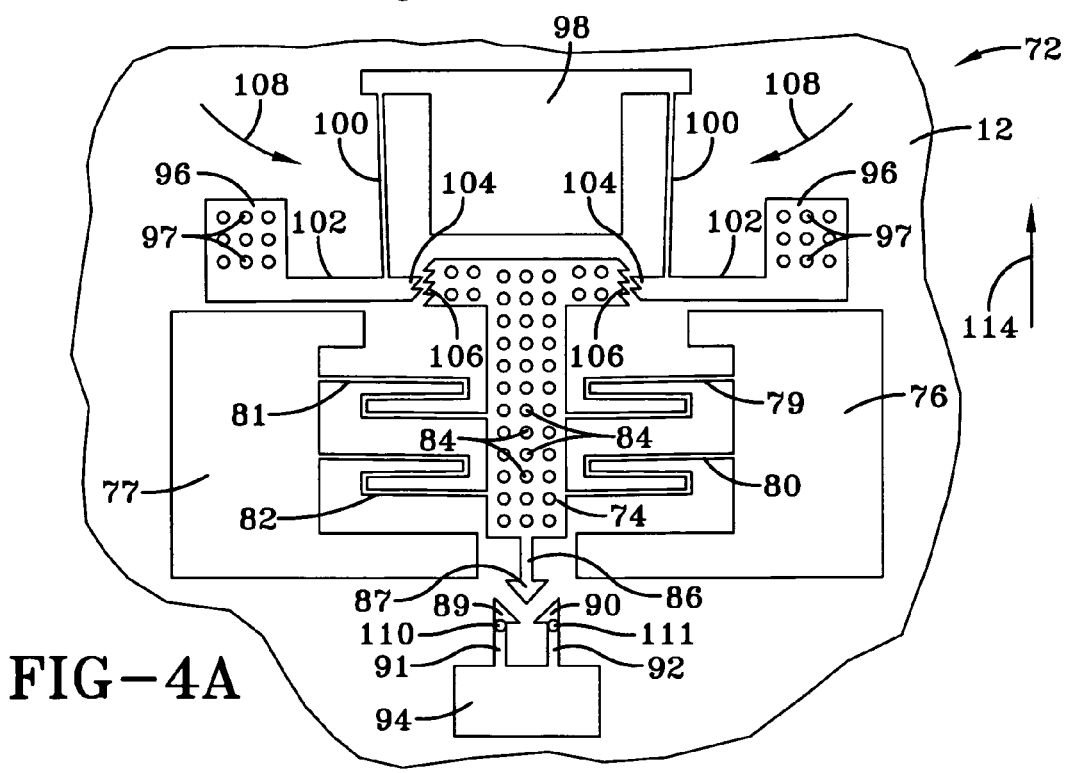
FIGS. 4A to 4C illustrate responses of the device of FIG. 4 to different accelerations.
Figure 4B:
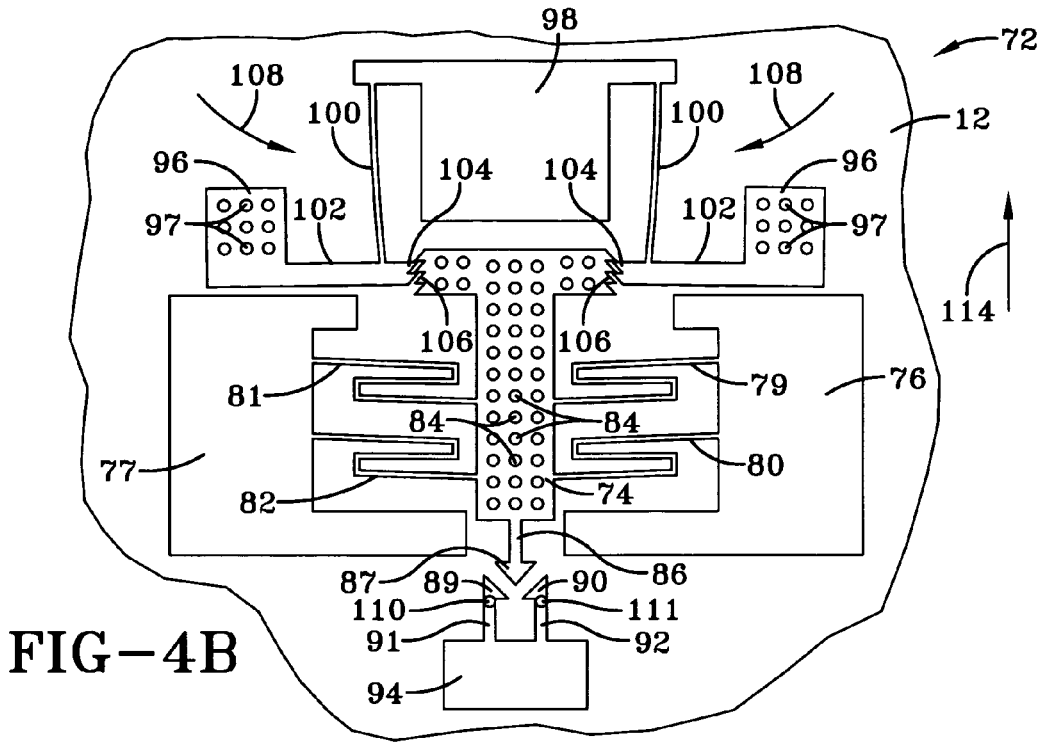

In an exemplary embodiment of an inertial shock bandpass filter 72 of FIG. 4, a primary inertial element 74 is connected to first and second supports 76 and 77 by a spring arrangement comprised of springs 79 to 82. Similar to the embodiment depicted in FIG. 3, inertial element 72 includes apertures 84, a latching arm 86, with arrowhead 87 for latching with arrowheads 89 and 90 at the end of projections 91 and 92 of latch 94.

Secondary inertial elements 96, which each have a lower mass than inertial element 74, include apertures 97. The inertial elements 96 are each connected to a support 98 by connection of respective springs 100 to extension arms 102. Teeth 104 at the ends of extension arms 102 are operable, under high acceleration conditions to mesh with teeth 106 on inertial element 74, to prevent its movement toward latch 94. Teeth 104, 106 are substantially adjacent to each other so as to be situated along a substantially same axis. With the arrangement of FIG. 4, in response to a vertical acceleration in the direction of arrow 107, each inertial element 96 will swing, pendulum style about the respective spring 100 in the direction of arrow 108, and thus the teeth 104, 106 may mesh.

Figure 4C:
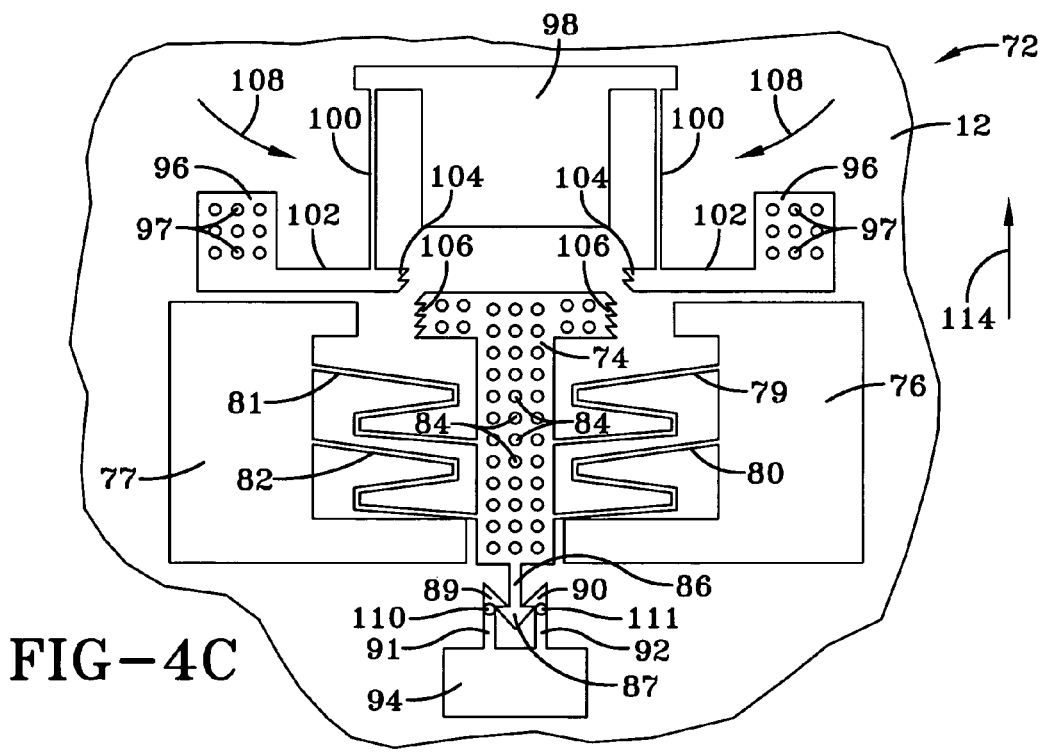

FIG. 4 also illustrates an alternative contact pad positioning for an electrical read out. More specifically, contact pads 110 and 111 are respectively positioned on projections 91 and 92. When latching arm 86 is captured in latch 94 (as in FIG. 4C), an electrical circuit will be completed through arrowheads 89, 87 and 90.

In a manner similar to that shown in FIGS. 3A to 3C, FIGS. 4A to 4C also illustrate the position of inertial shock bandpass filter 72 elements under acceleration conditions depicted by respective curves A, B and C of FIG. 1, in response to an acceleration in the direction of arrow 114.

It will be readily seen by one of ordinary skill in the art that the present invention fulfills the primary objects set forth herein. After reading the foregoing specification, one of ordinary skill in the art will be able to effect various changes, substitutions of equivalents and various other aspects of the present invention as broadly disclosed herein. It is therefore intended that the protection granted hereon be limited only by the definition contained in the appended claims and equivalents. Having thus shown and described what is at present considered to be exemplary embodiments of the present invention, it should be noted that the same has been made by way of illustration and not limitation. Accordingly, all modifications, alterations and changes coming within the spirit and scope of the present invention are herein meant to be included.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An inertial shock bandpass filter device for detecting a shock event between first and second acceleration levels, comprising:
    a primary inertial element;
    at least one secondary inertial element;
    a first support structure for said primary inertial element;
    a first spring arrangement connecting said primary inertial element to said first support structure;
    a second support structure for said secondary inertial element;
    a second spring arrangement connecting said secondary inertial element to said second support structure;
    a latch; and
    a common support,
        wherein said primary inertial element including a latch arm for latching with said latch when said primary inertial element moves far enough in response to an acceleration between said first and second acceleration levels,
        wherein said primary inertial element and said secondary inertial element including complementary engageable gripping surfaces which engage in response to an acceleration above said second acceleration level, said engagement preventing movement and latching of said primary inertial element,
        wherein an acceleration level below said first acceleration level is insufficient to cause either engagement of said gripping surfaces or latching of said latch arm with said latch,
        wherein said first support structure includes a first spaced-apart support and second spaced-apart support,
        wherein said first spring arrangement includes a first spring and a second spring, which connect said primary inertial element to said first spaced-apart support, and a third spring and a fourth spring, which connect said primary inertial element to said second spaced-apart support,
        wherein said at least one secondary inertial element comprises a first secondary inertial element and a second secondary inertial element, and
        wherein said first secondary inertial element and said second secondary inertial element are connected by said second spring arrangement to said first spaced-apart support and said second spaced-apart support as well as to said common support.

2. An inertial shock bandpass filter device according to claim 1, wherein a second mass-spring system of said secondary inertial element and associated springs connected thereto includes a slower response to acceleration than a first mass-spring system of said primary inertial element and associated springs connected thereto.

3. An inertial shock bandpass filter device according to claim 1, wherein a first mass of said primary inertial element is greater than a second mass of said secondary inertial element.

4. An inertial shock bandpass filter device according to claim 1, further comprising first and second electrical contact pads connecting to predetermined components of said inertial shock bandpass filter for electrically determining engagement of said latch arm with said latch,
    wherein said predetermined components of said inertial shock bandpass filter device are comprised of electrically conducting silicon.

5. An inertial shock bandpass filter device according to claim 1, wherein predetermined components of said inertial shock bandpass filter are comprised of electroplated metal material.

6. An inertial shock bandpass filter device for detecting a shock event, comprising:
    a primary inertial element;
    at least one secondary inertial element;
    a first support structure for said primary inertial element;
    a first spring arrangement connecting said primary inertial element to said first support structure;
    a second support structure for said secondary inertial element;
    a second spring arrangement connecting said secondary inertial element to said second support structure; and
    a latch; and
    a common support,
        wherein said primary inertial element including a latch arm for a first engagement with said latch when said primary inertial element moves far enough in response to a first acceleration between a first acceleration level and a second acceleration level,
        wherein said first support structure includes a first spaced-apart support and a second spaced-apart support,
            wherein said first spring arrangement includes a first spring and a second spring, which connect said primary inertial element to said first spaced-apart support, and a third spring and a fourth spring connect said primary inertial element to said second spaced-apart support,
            wherein said at least one secondary inertial element comprises a first secondary inertial element and a second secondary inertial element, and
            wherein said first secondary inertial element and said second secondary inertial element are connected by said second spring arrangement to said first spaced-apart support and said second spaced-apart support as well as to said common support.

7. An inertial shock bandpass filter device for detecting a shock event according to claim 6, wherein said primary inertial element and said secondary inertial element include complementary engageable gripping surfaces, which are engaged to produce a second engagement in response to a second acceleration above said second acceleration level.

8. An inertial shock bandpass filter device for detecting a shock event according to claim 7, wherein said first engagement prevents movement and latching of said primary inertial element.

9. An inertial shock bandpass filter device for detecting a shock event according to claim 7, wherein a third acceleration level below said first acceleration level is insufficient to cause one of said second engagement of said gripping surface and said first engagement due to latching of said latch arm with said latch.

* * * * *